United States Patent
Charchian et al.

[15] 3,693,770
[45] Sept. 26, 1972

[54] ANTI-REVERSE CLUTCH SAFETY DEVICE

[72] Inventors: Loris J. Charchian, Royal Oak; Thaddeus Lech, Warren, both of Mich.

[73] Assignee: Formspray Company, Warren, Mich.

[22] Filed: Dec. 9, 1970

[21] Appl. No.: 96,359

[52] U.S. Cl............192/30 W, 192/8 R, 192/12 B, 192/45.1, 200/61.39, 200/153 N, 340/271, 188/1 A
[51] Int. Cl.......G08b 21/00, F16d 41/07, H01h 3/16
[58] Field of Search.........192/30 W, 41 A, 45.1, 8 R, 192/12 B; 340/271; 81/52.5; 200/61.39, 153 N; 188/1 A

[56] References Cited

UNITED STATES PATENTS

| | | | |
|---|---|---|---|
| 2,427,453 | 9/1947 | Hadley | 200/61.39 |
| 2,743,803 | 5/1956 | Ferris | 192/41 A |
| 985,943 | 3/1911 | Sachs | 200/153 N |
| 1,307,725 | 6/1919 | Coe | 200/153 N |
| 2,143,550 | 1/1939 | Gilbert | 200/61.39 |
| 1,191,973 | 7/1916 | Johnson | 200/61.39 |
| 2,920,156 | 1/1960 | Rice et al | 200/61.39 |
| 3,233,053 | 2/1966 | Parks | 200/61.39 |

*Primary Examiner*—Allan D. Hermann
*Attorney*—Whittemore, Hulbert & Belknap

[57] ABSTRACT

A conventional over-running clutch-type "no back" mechanism normally backstops or grounds out a drive shaft in the event of a load thereon tending to cause reverse wind-up at clutch elements of the mechanism; and the latter is equipped with a safety device which signals the presence of excessive wind up or slip condition. The device is applied coaxially to the mechanism's drive shaft, and includes a sprag assembly torqued reversely in response to such undue slip or wind-up. The assembly is interposed radially between an outer rotatable race, and a cylindrical stud providing an inner race, both races being coaxial with the shaft; and the stud is coupled to rotate with the latter in its driving phase, in which the stud over-runs relative to the outer race. When shaft backstopping is in effect the sprag assembly transmits that torque to the outer race; and in response the excessive wind-up or slip, as picked up by the sprag assembly, the latter causes the outer race to rotate a bit. This minor rotation enables a part of the outer race to cammingly close an electric limit switch, thus originating a signal to audibly or visibly alert an attendant.

11 Claims, 3 Drawing Figures

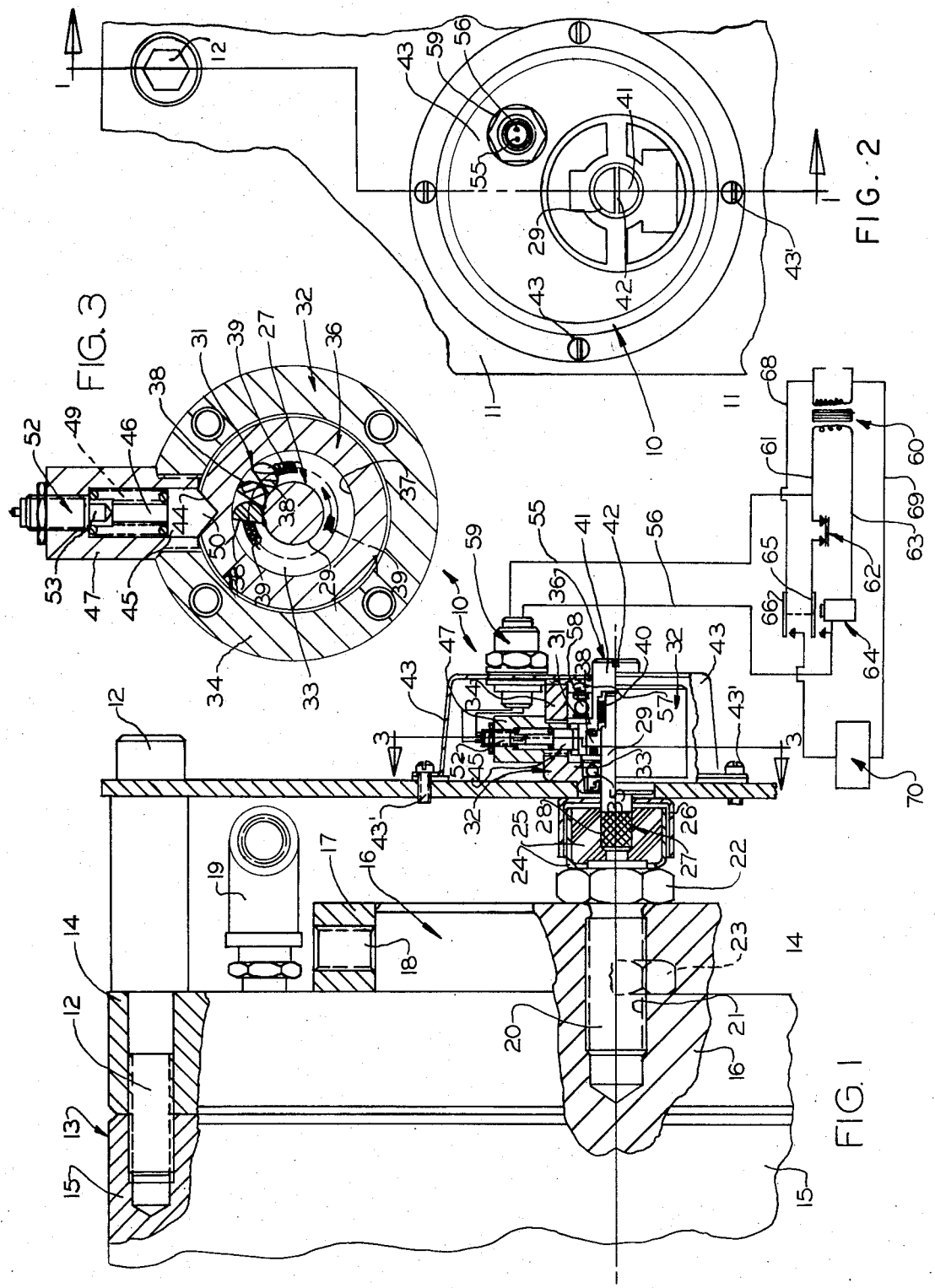
PATENTED SEP 26 1972
3,693,770
INVENTOR
LORIS J. CHARCHIAN
BY THADDEUS LECH
ATTORNEYS

ANTI-REVERSE CLUTCH SAFETY DEVICE

BACKGROUND OF THE INVENTION — FIELD

The invention finds application in any field in which an undue reverse slip or excessive wind-up of a torque transmitting, over-running type clutch or reverse backstopping brake mechanism is apt to be a safety threat or at least a source of inacceptable performance. A typical example, is an installation in which a known over-running no-back or anti-reverse unit, whether of a sprag type, a ball and ramp type or a grounding brake shoe type, backstops a an inclined endless belt or chain conveyor. Many other installations will, however, suggest themselves, for example, in the form of signalling equipment on any fixed or vehicular braked system in which brake failure or deterioration is apt to arise.

SUMMARY OF THE INVENTION

The invention superimposes onto a main driver shaft, as governed by an over-running or other type no-back, a second, similarly over-running type of clutch for the purpose of signalling a partial failure or deterioration at the no-back before it grows to serious proportion. The clutch is preferably one employing a full complement sprag assembly in the radial space between what amounts to a small diameter coaxial race extension of the driver shaft and an outer clutch race, a limited rotation of which outer race in response to slip or wind-up at the driver shaft no-back unit has the effect, mechanically and electrically, of triggering an alarm circuit for the purpose described above.

The interposed signalling clutch assembly or unit is very compact, inexpensively produced, and readily and quickly applied to an existing backstopped drive shaft.

Its inner race member or shaft extension is coupled to the backstopped drive shaft and will permit a permissible minor degree of slip or reverse wind-up torque of that shaft without tripping the electrical alarm system, but any such reverse effect, for example one indicative of excessive main shaft clutch wear, will be detected. A critical value as to the excess is determined in accordance with the setting of a spring biased limit switch tripped consequent to a rotation of the outer clutch race of the signalling unit, and signalling audibly or visibly to an attendant is the result. Thus a major wind-up or slip at the no-back to an extent requiring repair or replacement is instantaneously brought to the attention of the attendant and in an extreme case the signal is maintained until corrective or manual re-set action is taken. Other more minor instances are also signalled individually as they arise.

BRIEF DESCRIPTION OF THE DRAWING

FIG. 1 is a fragmentary view partially broken away and in vertical section on broken line 1—1 of FIG. 2, the section in major part being in a plane including the common axis of the backstopped drive shaft and the safety signalling device applied to the shaft;

FIG. 2 is a fragmentary view in end elevation, as from the right of FIG. 1; and

FIG. 3 is a view in transverse radial section along line 3—3 of FIG. 1.

DESCRIPTION OF A PREFERRED EMBODIMENT

The safety alarm device of the invention, generally designated by the reference numeral 10, is shown as being fixedly mounted upon the external surface of a vertically elongated rectangular face plate 11, which plate is in turn rigidly secured, as by four elongated studs 12 and interposed spacers in outwardly spaced relation to one axial end of a housing 13. The studs 12 extend through holes in a housing end plate 14, having threaded engagement in a main housing member 15. The latter encases, and affords an internal fixed cylindrical brake surface of, an entirely conventional no-back mechanism, which may typically be of a roller and ramp type, a disc type, a sprag type, an expanding brake shoe type, or the like. Examples are shown and described in the patents to Rasmussen, U.S. Pat. No. 3,200,916 of Aug. 17, 1965, and Kalns, U.S. Pat. No. 3,335,831 of Aug. 15, 1967 (FIGS. 1–5). Many others are old and well-known in the art, hence illustration here is deemed unnecessary. It suffices to state that in the event of an excess load torque on a shaft driver the excess is grounded out on a fixed brake surface, which for the present purpose may be considered to be represented by the housing member 15. Hence reverse torque is not transmitted in a manner to tend to rotate a driver shaft reversely of its normal direction.

The reference numeral 16 typically designates such a driver shaft, as powered from a suitable prime mover (not shown). It is shown as being rotatively journalled in the axial housing end plate 14, being restrained axially by an appropriate collar 17 held to the shaft by a set screw 18. Appropriate oil level gauge fittings 19 extend through plate 14 to the interior of the clutch, these components not being germane to the invention.

Pursuant to the invention, a small diameter threaded stem member or stud 20 is rigidly screwed in a bore 21 of the shaft 16 at the latter's axial center line, a hex head 22 of the stud 20 bearing tightly against the end of shaft 16, so that the stem member or stud 20 constitutes in effect, a small diameter axial extension of the shaft rotating unitarily with the latter. In the event that the shaft is one which does not project outwardly of housing plate 14, and a collar 17 is not employed, a jam nut 23 (dotted line in FIG. 1) may be threaded on the shank of stud 20, taking tightly against the end-exposed surface of driver shaft 16.

As shown in FIG. 1, shaft stem extension 20 fixedly carries outwardly of its hex head 22, an axially outwardly opening cup member 24, to the interior of which an annular torsion transmitting block member 25 of a a medium hard grade rubber is bonded; and cup member 25 is externally telescoped with slight radial clearance by a shielding cup member 26 suitably fixed on the inner surface of end plate 11.

The axial bore of resilient torsion transmitting block 25 fixedly receives a coaxial cylindrical stem member 27, which may have a knurled inner end portion 28 forced into the bore of block 25 to effect a driving connection with the latter. The portion 29 of stem member 27 to the right of plate 11, through an opening in which it extends, is of true and externally smooth cylindrical cross section; and this portion 29 serves as an inner operating or driver race of an alarm-controlling sprag sub-assembly of the device 10.

This assembly, generally designated by the reference numeral 31, is coaxially received within a fixed clutch housing 32 of cup-shaped cross section, including an annular radial wall portion 33 secured by screws (FIG. 3) to the outer wall of plate 11, and a cylindrical, axially extending wall portion 34. A ball bearing 35 recessed in the bore of radial wall portion 33 serves as a journal for the stem portion 29, which portion affords an inner race surface of sprag assembly 31. A specially cross-sectioned, manually adjustable member 36 of the sprag assembly provides an outer and driven sprag race surface 37 radially opposed to the driving race surface at 29 on the stem member 27, being radially spaced from the latter; and a full complement set of sprags 38 is received in the space between the race surfaces 29 and 37.

As best shown in FIG. 3, the sprags 38 are of a well-known D-shaped cross section, being energized for engagement between the coaxial races by a pair of conventional annular garter springs 39. In a driving phase of operation of the backstopped main shaft 16, the direction of rotation of that shaft; hence of the stem race extension 29, will be counter clockwise, as viewed in FIG. 3; and the extension 29 will freely overrun in that direction the outer race surface 37 and the set of sprags 38, which will bear slidably on the driver race at 29. However, when driving torque ceases, the backstopped shaft load will act on the complement of sprags in the reverse, clockwise direction; and they will, in normal locked-up sprag-operating fashion, drivingly couple the inner race 29 with the outer race 37 of clutch assembly 31.

The latter thus becomes subject to the backstopped clockwise-acting torque, as transmitted from driver shaft 16 through the primary shaft stud extension 20 and resilient torque transmitting block member 25 to the inner race member 27 at 29.

Sprag outer race member 36 has an intermediate diameter bore portion receiving a small needle bearing 40 to journal member 36 in relation to driver race 29; and the member 36 is also provided with an integral, reduced diameter reset stem formation 41. This carries at its outer axial end a kerf or slot 42 to receive a screw driver for resetting the device 10 in the event of a slip or wind-up motion, as transmitted through the sprag assembly 31, exceeds a predetermined critical value, as will be described. The reset stem formation 41 extends through an opening in a cupped protective casing 43 which is secured by screws 43' to the outer surface of the end plate 11.

As best shown in FIG. 3, the outer race member 36 of clutch assembly 31 is for the most part cylindrical at its outer largest diameter surface. However, this surface is provided with a V-shaped camming notch 44 paralleling the axis of the race surface 37, the notch normally receiving nestingly a radially inward head formation 45 of a switch operating stem 46 which acts in the manner of a cam follower in reference to the camming notch 44 of driver race member 36.

Stem head 45 is slidably guided in the cylindrical radially extending bore of a generally cylindrical tubular cap 47, which is threadedly received fixedly in a radial opening through the cylindrical wall portion 34 of the housing 32 for the sprag assembly 31. A coil compression spring 49 surrounds the stem 46 within the cap bore, acting against and normally urging the stem follower head 45 radially inwardly. This head has a V-shaped nose 50 which is thus normally spring-urged into the V-shaped camming notch 44 of race member wall 34.

A conventional limit switch 52, normally spring biased to open condition by standard internal means, is threadedly received in an end bore of the guide cap 47, the operating plunger 53 of this switch normally engaging radially inwardly under internal switch spring bias against the radially outer end of the operating stem 46. Conventional electrical leads 55 and 56 are operatively connected to internal terminals of limit switch 52, which terminals are electrically connected when a predetermined radial movement of the operating stem 46, under camming shift of its V-nose 50 by the clutch race portion notch 44, exceeds a certain extent. This is determined precisely by an appropriate pre-set adjustment of switch 52 at the time of installation of the signalling alarm device 10.

Referring to FIG. 1 suitable compressable gasket or packing 57 is interposed between the inner surface of shielding cup 43 and the housing 32 for sprag assembly 31, abutting to the left against a relatively large diameter ball bearing 58, which constitutes a main journal support for the outer race member 36 within the housing 32. The other ball bearing 35 and needle bearing 40 similarly journal the inner race 29.

The electrical lead 55, 56 are brought externally of the shield cup or casing 43 through a conventional connector 59, being externally connected to an alarm circuit appearing schematically in FIG. 1. This circuit comprises a supply transformer 60 connected to an appropriate 120 volt alternating current source, with the secondary side of the transformer 60 connected by a lead 61 to a contact of a normally closed, manually operated reset switch 62, the lead 55 of limit switch 52 tapping into the lead 60. Another transformer secondary lead 63 extends to a coil terminal of a normally open holding relay 64 controlling ganged armature contacts 65 and 64, the former of which is connected to a second contact of reset switch 61. When the contacts 64, 65 are closed, upon closing of the circuit of limit switch 52, a sub-circuit is completed which includes leads 68 and 69 connected to primary input terminals of the supply transformer 59, the relay contactor 66, and the terminals of a 120 volt visible or audible alarm unit 70 of a conventional nature.

In the operation of the unit 10, its inner race member 29 will normally overrun the set of sprags 38 and the outer race member 36 in the counter clockwise direction by the arcuate arrow in FIG. 3, as mentioned above. Under a tendency of clutching slip at the no-back mechanism, or of an undue reverse wind-up, this torque factor is imposed in a clockwise direction (FIG. 3) on the sprag set. Camming notch 44 of outer race member 36 thus exerts a strong radially outward bias upon the V-nosed head 45 of operator stem 46, which force may well be, in a relatively slight rotation of outer race member 36, adequate to cause closure of limit switch 52, with at least a momentary completion of the alarm circuit and a lighting or sounding of the alarm device 70. If a condition of minor slip or wind-up exists, upon its ceasing the built-in spring bias of limit switch 52 may well automatically re-set the operator member 46 in a radially inward direction, thus automatically counter-rotating the outer race member 36 to an original position, whereupon the alarm circuit automatically disconnects.

If, however, the wind up continues and camming force exerted by outer race 36 continues, and becomes sufficient to rotate the outer race as much as a critical value of, say, 15°, this will suffice to raise operating member or stem 46 enough that its V-nose formation 50 will come to rest upon the outer cylindrical surface of race member 36 directly adjoining the camming notch formation 44, which cylindrical surface portion then becomes a holding formation sustaining the follower head 45 in a fully raised position. The limit switch 52 then remains locked in a closed condition; and the alarm circuit continues energized. A serious condition of continuing slip or excessive wind-up in to the backstopping no-back is signalled, whereupon the attendant will manually operate the re-set switch 62 opening the relay circuit of relay 64 and de-energizing alarm device 70. After taking a suitable corrective measure, the attendant will, using a screw driver, operate the slotted stem extension 41 of the outer race 36 in a direction to enable the enlarged head 45 of switch operating stem 46 to re-set radially inwardly into the notch 44, at which time the device 10 has been re-set to condition for a new operating cycle.

What is claimed is:

1. In a load condition indicating device, a unit including a first rotatable part having means to connect the same for rotation in timed relation to that of a rotative load sustaining member whose load condition is to be indicated, a second rotatable part, means operatively connecting said parts for substantially unitary rotation together to an extent determined by said condition, and means responsive to said substantially unitary rotation of said second part with the first part to initiate a signal indicative of the condition, said parts-connecting means being an overrunning clutch assembly in which said first and second parts respectively constitute coaxial driving and driven races, and a set of torque-transmitting elements operatively interposed between said races, said assembly permitting substantially free rotation of one of said parts relative to the other part in the direction reverse of said substantially unitary rotation, said second, driven race part having an external cam formation thereon adjoined by a holding formation, said responsive signal-initiating means comprising a follower element engaged with said cam formation and operated by the latter to initiate a said signal in a conjoint unitary rotation of said race parts to a predetermined angular extent, a conjoint rotation of second race part beyond said predetermined angular extent causing said follower element to be moved by said cam formation to said holding formation and held by the latter as so moved.

2. The device of claim 1, in which said overrunning clutch assembly is a sprag type in which said first and second parts respectively constitute coaxial driving and driven races, said set of torque-transmitting elements comprising sprags operatively interposed between said races, said assembly permitting substantially free rotation of said first part beyond the second part in the direction reverse of said substantially unitary rotation in the absence of said rotation.

3. The device of claim 1, in which said signal-initiating means further comprises an electric switch operated by said follower element in response to said substantially unitary rotation.

4. The device of claim 1, in which said first-named connecting means is in part resilient.

5. The device of claim 5, in which said first-named connecting means is in part resilient.

6. The device of claim 3, in which said first-named connecting means is coaxial with said first rotatable part and said rotative load sustaining member.

7. The device of claim 3, in which said first-named connecting means is in part resilient and is coaxial with said first rotatable part and said rotative load sustaining member.

8. The combination with a clutch mechanism releasably operable in torque-transmitting relation to a rotary member subject to load, of a device to signal the existence of an overload torque condition as received and borne by said member, said device comprising a first race part rotatable in timed relation to said rotary member, a second race part coaxial with said first race part, an annular over-running clutch assembly radially interposed between said race parts and releasably coupling the same for conjoint rotation together under and in the rotative direction of said torque, the race parts overrunning rotatively in the reverse direction, and signalling means including a unit operated in response to a rotation of said second race part conjointly with the first race part to initiate a signal.

9. The combination of claim 8, in which said second race part has an external cam formation thereon adjoined by a holding formation, said signalling means comprising a follower element engaged with said cam formation and operated by the latter to initiate a signal in a conjoint unitary rotation of said race parts to a predetermined angular extent, a conjoint rotation of second race part beyond said predetermined angular extent causing said follower element to be moved by said cam formation to said holding formation and held by the latter as so moved, whereby the initiated signal is a continuing one.

10. The combination with an anti-reverse feed back clutch mechanism operable in torque-transmitting relation to a rotary shaft subject to load, of a device to signal the existence of an overload torque condition as received and borne by said shaft, said device comprising a first race part rotatable in fixed coaxial relation with said shaft, a second race part coaxial with said first race part, an annular overrunning clutch assembly radially interposed between said race parts and releasably coupling the same for conjoint rotation together under and in the rotative direction of the torque overload, the race parts overrunning rotatively in the reverse direction, and signalling means including an electric switch operated directly in response to a rotation of said second race part conjointly with the first race part to initiate an electrical signal.

11. The combination of claim 10, in which said second race part has an external cam formation thereon adjoined by a holding formation, said signalling means comprising a follower element engaged with said cam formation and operated by the latter to initiate a signal in a conjoint unitary rotation of said race parts to a predetermined angular extent, a conjoint rotation of second race part beyond said predetermined angular extent causing said follower element to be moved by said cam formation to said holding formation and held by the latter as so moved, whereby the operation of said switch continues and the initiated electrical signal is a continuing one.

* * * * *

UNITED STATES PATENT OFFICE
CERTIFICATE OF CORRECTION

Patent No. 3,693,770          Dated September 26, 1972

Inventor(s) Loris J. Charchian and Thaddeus Lech

It is certified that error appears in the above-identified patent and that said Letters Patent are hereby corrected as shown below:

In the caption, item 73, the spelling of the name of the assignee should be corrected to read "Formsprag" Company.

The words "in the absence of said rotation" should be deleted from the last line of Claim 2.

In the first line of Claim 5, the numeral "5" should be changed to --2--.

Signed and sealed this 24th day of April 1973.

(SEAL)
Attest:

EDWARD M. FLETCHER, JR.                ROBERT GOTTSCHALK
Attesting Officer                      Commissioner of Patents